(12) United States Patent
Huang et al.

(10) Patent No.: US 12,410,541 B2
(45) Date of Patent: Sep. 9, 2025

(54) CHITIN-CONTAINING POLYESTER FILAMENT AND PREPARATION METHOD THEREOF

(71) Applicant: Bestee Material (Qingdao) Co., Ltd., Qingdao (CN)

(72) Inventors: Xiaohua Huang, Qingdao (CN); Yanming Liu, Qingdao (CN); Xiaoqian Huang, Qingdao (CN); Yu Liu, Qingdao (CN); Jie Liu, Qingdao (CN); Li Zhen, Qingdao (CN)

(73) Assignee: BYHERB FUTURE HEALTH TECHNOLOGY (QINGDAO) CO., LTD., Qingdao (CN)

( * ) Notice: Subject to any disclaimer, the term of this patent is extended or adjusted under 35 U.S.C. 154(b) by 884 days.

(21) Appl. No.: 17/668,547

(22) Filed: Feb. 10, 2022

(65) Prior Publication Data

US 2022/0162774 A1    May 26, 2022

Related U.S. Application Data

(63) Continuation of application No. PCT/CN2020/097915, filed on Jun. 24, 2020.

(30) Foreign Application Priority Data

Mar. 3, 2020 (CN) .......................... 202010139156.3

(51) Int. Cl.
| | |
|---|---|
| D01F 1/10 | (2006.01) |
| C08B 37/08 | (2006.01) |
| D01D 1/02 | (2006.01) |
| D01D 5/06 | (2006.01) |
| D01F 6/92 | (2006.01) |

(52) U.S. Cl.
CPC ............ D01F 1/103 (2013.01); C08B 37/003 (2013.01); D01D 1/02 (2013.01); D01D 5/06 (2013.01); D01F 6/92 (2013.01)

(58) Field of Classification Search
CPC ... D01F 1/103; D01F 6/92; D01F 1/10; C08B 37/003; D01D 1/02; D01D 5/06; D01D 5/08; D01D 5/16; D01D 10/02; C08L 5/08
See application file for complete search history.

(56) References Cited

U.S. PATENT DOCUMENTS

| | | | |
|---|---|---|---|
| 6,551,705 B1 | 4/2003 | Ohnishi et al. | |
| 2006/0177489 A1* | 8/2006 | Massouda | C08J 7/0427 |
| | | | 424/443 |
| 2021/0180213 A1* | 6/2021 | Huang | C08L 23/12 |

FOREIGN PATENT DOCUMENTS

| | | | |
|---|---|---|---|
| CN | 102408628 A | * | 4/2012 |
| CN | 103172989 A | | 6/2013 |
| CN | 106496924 A | | 3/2017 |
| CN | 107955988 A | | 4/2018 |
| CN | 108486680 A | | 9/2018 |
| CN | 109735956 A | | 5/2019 |
| CN | 109797454 A | | 5/2019 |
| CN | 110274969 A | | 9/2019 |
| CN | 111172614 A | | 5/2020 |

OTHER PUBLICATIONS

Machine translation of CN 102408628 (Year: 2012).*
The World Intellectual Property Organization (WIPO) International Search Report for PCT/CN2020/097915 Dec. 7, 2020 8 pages (including translation).
Fang Zhang et al., "Chitosan/Chitooligosaccharide Modified by Quaternary Salt and Its Application in Textile Field", Progress in Textile Science & Technology, Dec. 31, 2011, No. 01, Section 2.2 and 3.1 and 4.

* cited by examiner

*Primary Examiner* — Doris L Lee
(74) *Attorney, Agent, or Firm* — ANOVA LAW GROUP, PLLC

(57) ABSTRACT

A chitin-containing polyester filament and a preparation method of the chitin-containing polyester filament are provided. The method includes preparing a modified chitin; preparing a chitin-containing functional modifier based on the modified chitin; preparing polyester (PET) functional particles based on the chitin-containing functional modifier and PET pellets; preparing a mixed spinning solution based on the polyester functional particles, where a weight percentage of the polyester functional particles is in a range of approximately 2%-4% based on a total weight of the mixed spinning solution; and performing a spinning molding of the mixed spinning solution to form the chitin-containing polyester filament.

16 Claims, No Drawings

CHITIN-CONTAINING POLYESTER FILAMENT AND PREPARATION METHOD THEREOF

CROSS-REFERENCE TO RELATED APPLICATION

This application is a continuation application of PCT Patent Application No. PCT/CN2020/097915, filed on Jun. 24, 2020, which claims the priority of Chinese patent applications No. 202010139156.3, filed on Mar. 3, 2020, the entirety of all of which is incorporated herein by reference.

FIELD OF THE DISCLOSURE

The present disclosure generally relates to the field of textile technology and, more particularly, relates to a chitin-containing polyester filament and a preparation method thereof.

BACKGROUND

The scientific name of polyester is polyethylene terephthalate fiber, which is called polyester fiber for short. The polyester fiber is a fiber made by spinning and post-processing the polyethylene terephthalate (PET), which is a fiber-forming polymer made of purified terephthalic acid (PTA) and ethylene glycol (EG) through esterification and polycondensation reactions, and has a wide range of applications in the field of apparel fabrics.

Chitin is a rich natural resource, and is naturally synthesized over 1 billion tons every year. Chitin is the second most abundant natural organic matter on the earth, and is merely less than cellulose fiber. Chitin is a natural polysaccharide, and has both the biological functions of collagen in higher animal tissues and cellulose in higher plant tissues. Chitin is highly compatible with animals and plants, is biodegradable and non-toxic, and has become a new material with a wide application range in recent years. By adding the natural modified chitin substance to polyester, the antibacterial polyester fiber is prepared, and then a series of antibacterial textiles are prepared.

In the prior art, the antibacterial agent is often evenly sprayed on the surface of the fabric. Such method is simple and easy to be implemented, while the directly sprayed chitin antibacterial substance tends to be lost during use, which weakens the antibacterial effect, such that the antibacterial performance is not long-lasting. When the chitin antibacterial substance is added into spinning fiber products, the chitin antibacterial substance tends to be carbonized during the high-temperature spinning process, which affects elasticity of the fiber, and may affect the appearance of high-end products. The disclosed methods and polyester fiber are directed to solve one or more problems set forth above and other problems.

BRIEF SUMMARY OF THE DISCLOSURE

One aspect of the present disclosure provides a preparation method of a chitin-containing polyester filament. The method includes preparing a modified chitin, and preparing a chitin-containing functional modifier based on the modified chitin. The method also includes preparing polyester (PET) functional particles based on the chitin-containing functional modifier and PET pellets. Moreover, the method includes preparing a mixed spinning solution based on the polyester functional particles. A weight percentage of the polyester functional particles is in a range of approximately 2%-4% based on a total weight of the mixed spinning solution. Further, the method includes performing a spinning molding of the mixed spinning solution to form the chitin-containing polyester filament.

In one embodiment, the mixed spinning solution further includes an accelerator. A weight percentage of the added accelerator is in a range of approximately 3%-6% based on the total weight of the mixed spinning solution, and the accelerator includes amino silicone oil and n-butyl titanate in a mixing ratio of approximately (0.25-0.40):1.

In one embodiment, the mixed spinning solution further includes ordinary polyester chips.

In one embodiment, in preparation of the chitin-containing functional modifier, a solvent is triethyl citrate.

In one embodiment, preparing the chitin-containing functional modifier includes: dissolving the modified chitin in the solvent to form a triethyl citrate solution, and sequentially adding diatomite, porogen and precipitant into the triethyl citrate solution.

In one embodiment, a mass ratio of the modified chitin over the diatomite is in a range of approximately (3.2-5.0):1.

In one embodiment, the porogen includes one of $CaCl_2$, $MgCl_2$ and NaCl, and a weight percentage of the porogen is in a range of approximately 1.2%-2.8% based on a total weight of the chitin-containing functional modifier.

In one embodiment, the precipitant is ethylene-vinyl acetate (EVA). A weight percentage of vinyl acetate is in a range of approximately 25%-28.5%, a melt index of the precipitant is in a range of approximately (22 g-24 g)/10 min at 190° C. for 2.15 kg, and a weight percentage of the added precipitant is in a range of approximately 8.0%-12.5% based on a total weight of the chitin-containing functional modifier.

In one embodiment, preparing the modified chitin includes: a deacetylation process, an amination modification process, and a separation and purification process.

In one embodiment, in the deacetylation process, an amino groups-containing chitosan suspension is produced. An alkaline solution includes a sodium hydroxide solution and a potassium hydroxide solution each having a weight percentage in a range of approximately 40%-45% mixed in equal proportions. A weight percentage of chitin is in a range of approximately $\frac{1}{20}$-$\frac{1}{25}$ based on a total weight of the mixed alkaline solution to form the amino groups-containing chitosan suspension. A deacetylation degree of the chitosan in the amino groups-containing chitosan suspension is in a range of approximately 80%-92%.

In one embodiment, in the amination modification process, hydroxypropyl trimethyl ammonium nitride and a catalyst are added into the amino groups-containing chitosan suspension, to form a quaternary ammonium salt solution. A weight of the added hydroxypropyl trimethyl ammonium nitride is approximately 0.50-0.58 times of a weight of the chitin. The catalyst includes zinc phosphomolybdate, and a weight percentage of the catalyst is in a range of approximately 0.11%-0.32% in a catalyst solution.

In one embodiment, in the separation and purification process, acetone is slowly added dropwise to the quaternary ammonium salt solution. A volume ratio of the dripped acetone over the quaternary ammonium salt solution is in a range of approximately 1:(3-4).

In one embodiment, preparing the polyester functional particles includes adding the chitin-containing functional modifier, the PET pellets, titanium dioxide, sodium carboxymethyl cellulose, and diisopropyl trisulfide into a mixer for stirring and granulation. The stirring process includes a speed in a range of approximately 1000 rpm-1200 rpm, and a duration in a range of approximately 60 minutes-90 minutes.

In one embodiment, a diameter of a polyester functional particle is in a range of approximately 1 mm-2 mm. The polyester functional particle includes following raw material components calculated in parts by weight: 50-60 parts of the PET pellets, 20-25 parts of the chitin-containing functional modifier, 3-6 parts of titanium dioxide, 6-12 parts of sodium carboxymethyl cellulose, and 6-12 parts of diisopropyl trisulfide.

In one embodiment, parameters of the spinning molding process include: a first hot rolling temperature in a range of approximately 168° C.-175° C., for a first drawing rate in a range of approximately 1200 m/min-1250 m/min; a second hot rolling temperature in a range of approximately 85° C.-90° C., for a second drawing rate in a range of approximately 3680 m/min-3700 m/min; and a winding speed in a range of approximately 1560 m/min-1860 m/min.

In one embodiment, parameters of the spinning molding process further include: an extrusion temperature of melt spinning in a range of approximately 250° C.-265° C., an initial pressure of approximately 8 MPa, and a molding temperature in a range of approximately 120° C.-130° C.

Another aspect of the present disclosure provides a chitin-containing polyester filament prepared by the above-disclosed method.

In one embodiment, the modified chitin is in a weight percentage range of approximately 0.1%-3% based on a total weight of the chitin-containing polyester filament.

In one embodiment, an antibacterial rate of the chitin-containing polyester filament against *Staphylococcus aureus, Escherichia coli* and *Candida albicans* is in a range of approximately 95.2%-98.5%.

In one embodiment, for the chitin-containing polyester filament, a monofilament fineness is in a range of approximately 2.0 dtex-3.5 dtex, a breaking strength is in a range of approximately 5.2 cN/dtex-5.8 cN/dtex, a breaking elongation is in a range of approximately 38.5%-40%, a CV value of the breaking elongation is in a range of approximately 8.5%-9.0%, a light transmittance is in a range of approximately 71%-75.2%, and a dry heat shrinkage rate is in a range of approximately 2.5%-3.2%.

Other aspects of the present disclosure can be understood by those skilled in the art in light of the description, the claims, and the drawings of the present disclosure.

DETAILED DESCRIPTION

Exemplary Embodiment 1

The present disclosure provides a chitin-containing polyester filament and a preparation method of the chitin-containing polyester filament. The preparation method may include following.
Step 1: Preparation of Modified Chitin.
1) Deacetylation.

A certain amount of chitin may be added into an alkaline solution where the sodium hydroxide solution and potassium hydroxide solution each having a weight percentage of 40% are mixed in equal proportions, to form a mixture 1. Then, a temperature of the mixture 1 may raise to approximately 65° C., a stirring speed of the mixture 1 may increase to 260 rpm, and the mixture 1 may be maintained at such temperature and stirring speed for approximately 10 hours. Through the deacetylation reaction, an amino groups-containing chitosan suspension may be produced. A weight percentage of the chitin may be approximately 1/25 based on a total weight of the mixed alkaline solution. A deacetylation degree of the chitosan may be approximately 80%.
2) Amination Modification.

Hydroxypropyl trimethyl ammonium nitride may be added into the above chitosan suspension, and then a catalyst may be added to form a mixture 2. A temperature of the mixture 2 may raise to approximately 70° C., and the mixture 2 may undergo a reaction at such temperature for approximately 10 hours, such that the suspension may gradually turn into a clear yellow quaternary ammonium salt solution. A weight of the added hydroxypropyl trimethyl ammonium nitride may be 0.50 times of the weight of chitin. The catalyst may be zinc phosphomolybdate, and a weight percentage of the catalyst may be approximately 0.11% in a catalyst solution.
3) Separation and Purification.

Acetone may be slowly added dropwise to the quaternary ammonium salt solution to form a mixture 3, and then the mixture 3 may be placed in a refrigerator at a temperature of approximately minus 20° C. overnight. A modified chitin crystal may be produced by standing precipitation, filtration, watching filter cake with ice ethanol until the filtrate is clear, and drying in a vacuum drying oven at a temperature of approximately 45° C. In the separation and purification process, a volume ratio of the dripped acetone over the quaternary ammonium salt solution may be approximately 1:3.0.
Step 2: Preparation of Chitin-Containing Functional Modifier.

The modified chitin crystal may be added into a triethyl citrate solution which has a weight of 10 times of the modified chitin crystal and may be dissolved by stirring, and then diatomite, porogen and precipitant may be sequentially added to form a mixture 4. A temperature of the mixture 4 may raise to approximately 80° C., and the mixture 4 may be mixed at a stirring speed of approximately 1800-2000 rpm for 30 minutes, such that the ethylene-vinyl acetate (EVA, a copolymer of ethylene and vinyl acetate) coated particles may be gradually precipitated out. By standing and cooling the mixture 4 at room temperature, the chitin-containing functional modifier may be obtained.

A mass ratio of the modified chitin crystal over the diatomite may be approximately 3.2:1. The porogen may be $CaCl_2$), and a weight percentage of the added porogen may be approximately 1.2% based on a total weight of the chitin-containing functional modifier. The precipitant may be EVA, where a weight percentage of the vinyl acetate may be approximately 25.0%. A melt index of the precipitant may be approximately 22.1 g/10 min at 190° C. for 2.15 kg, and a weight percentage of the added precipitant may be approximately 8.0% based on the total weight of the chitin-containing functional modifier.
Step 3: Preparation of Polyester Functional Particles.

The chitin-containing functional modifier, PET pellets, titanium dioxide, sodium carboxymethyl cellulose, and diisopropyl trisulfide may be added into a mixer for stirring and granulation. The stirring process may include a speed of approximately 1000 rpm and a duration of approximately 60 minutes, and a diameter of a produced particle may be in a range of approximately 1 mm-2 mm.

The polyester functional particle may include following raw material components calculated in parts by weight: 50 parts of PET pellets, 25 parts of chitin-containing functional modifier, 3 parts of titanium dioxide, 12 parts of sodium carboxymethyl cellulose, and 10 parts of diisopropyl tri sulfide.

Step 4: Preparation of a Mixed Spinning Solution.

Ordinary polyester chips, the polyester functional particles, and accelerator may be added into a feeding port at the middle of the twin-screw extruder, and the twin-screw extruder may perform a high-speed melt blending process at a temperature of approximately 320° C., to obtain the mixed spinning solution.

The high-speed melt blending process may include a rotation speed of approximately 1000 rpm, and a blending duration of approximately 60 minutes. A weight percentage of the polyester functional particles may be approximately 2.0%, and a weight percentage of the accelerator may be approximately 3% based on a total weight of the mixed spinning solution. The accelerator may include amino silicone oil and n-butyl titanate in a mixing ratio of approximately 0.25:1.

Step 5: Spinning Molding.

Main spinning process parameters of polyester filament may include: an extrusion temperature of melt spinning of approximately 250° C., an initial pressure of approximately 8 MPa, a side blowing cooling air temperature of approximately 25° C., a first hot rolling temperature of approximately 168° C., a first drawing rate of approximately 1200 m/min, a second hot rolling temperature of approximately 85° C., a second drawing rate of approximately 3680 m/min, a molding temperature of approximately 120° C., and a winding speed of approximately 1560 m/min. Therefore, the chitin-containing polyester filament may be produced.

The chitin-containing polyester filament prepared according to embodiment 1 may have an antibacterial rate of approximately 95.2% against *Staphylococcus aureus, Escherichia coli, Candida albicans*, and any other bacteria that infects humans. The antibacterial polyester textile produced from knitting yarn composed of the chitin-containing polyester and cotton in a mass ratio of 30/70 may have an antibacterial rate of approximately 91.5%, and may still have an antibacterial rate of approximately 84.6% even after being washed 60 times, thereby having desired antibacterial durability. The chitin-containing polyester filament may have a monofilament fineness of approximately 2.0 dtex, a breaking strength of approximately 5.5 cN/dtex, a breaking elongation of approximately 40.0%, a CV value of the breaking elongation of approximately 8.5%, a uniform color, a light transmittance of approximately 71.0%, and a dry heat shrinkage rate of approximately 2.8%, and may not have obvious carbon black and particle agglomeration that are visible to the naked eye. Therefore, the disclosed chitin-containing polyester filament may be suitable for making high-end textile products.

Exemplary Embodiment 2

The present disclosure provides another chitin-containing polyester filament and a preparation method of the chitin-containing polyester filament. The preparation method may include following.

Step 1: Preparation of Modified Chitin.

1) Deacetylation.

A certain amount of chitin may be added into an alkaline solution where the sodium hydroxide solution and potassium hydroxide solution each having a weight percentage of 45% are mixed in equal proportions, to form a mixture 1. Then, a temperature of the mixture 1 may raise to approximately 70° C., a stirring speed of the mixture 1 may increase to 300 rpm, and the mixture 1 may be maintained at such temperature and stirring speed for approximately 10 hours. Through the deacetylation reaction, an amino groups-containing chitosan suspension may be produced. A weight percentage of the chitin may be approximately 1/23 based on a total weight of the mixed alkaline solution. A deacetylation degree of the chitosan may be approximately 85%.

2) Amination Modification.

Hydroxypropyl trimethyl ammonium nitride may be added into the above chitosan suspension, and then a catalyst may be added to form a mixture 2. A temperature of the mixture 2 may raise to approximately 80° C., and the mixture 2 may undergo a reaction at such temperature for approximately 12 hours, such that the suspension may gradually turn into a clear yellow quaternary ammonium salt solution. A weight of the added hydroxypropyl trimethyl ammonium nitride may be 0.55 times of the weight of chitin. The catalyst may be zinc phosphomolybdate, and a weight percentage of the catalyst may be approximately 0.22% in a catalyst solution.

3) Separation and Purification.

Acetone may be slowly added dropwise to the quaternary ammonium salt solution to form a mixture 3, and then the mixture 3 may be placed in a refrigerator at a temperature of approximately minus 20° C. overnight. A modified chitin crystal may be produced by standing precipitation, filtration, watching filter cake with ice ethanol until the filtrate is clear, and drying in a vacuum drying oven at a temperature of approximately 45° C. In the separation and purification process, a volume ratio of the dripped acetone over the quaternary ammonium salt solution may be approximately 1:3.4.

Step 2: Preparation of Chitin-Containing Functional Modifier.

The modified chitin crystal may be added into a triethyl citrate solution which has a weight of 10 times of the modified chitin crystal, and may be dissolved by stirring, and then diatomite, porogen and precipitant may be sequentially added to form a mixture 4. A temperature of the mixture 4 may raise to approximately 85° C., and the mixture 4 may be mixed at a stirring speed of approximately 2000 rpm for 50 minutes, such that the ethylene-vinyl acetate (EVA) coated particles may be gradually precipitated out. By standing and cooling the mixture 4 at room temperature, the chitin-containing functional modifier may be obtained.

A mass ratio of the modified chitin crystal over the diatomite may be approximately 3.9:1. The porogen may be $MgCl_2$, and a weight percentage of the added porogen may be approximately 2.0% based on the total weight of the chitin-containing functional modifier. The precipitant may be EVA, where a weight percentage of the vinyl acetate may be approximately 26.8%. A melt index of the precipitant may be approximately 22.9 g/10 min at 190° C. for 2.15 kg, and a weight percentage of the added precipitant may be approximately 10.5% based on the total weight of the chitin-containing functional modifier.

Step 3: Preparation of Polyester Functional Particles.

The chitin-containing functional modifier, PET pellets, titanium dioxide, sodium carboxymethyl cellulose, and diisopropyl trisulfide may be added into a mixer for stirring and granulation. The stirring process may include a speed of approximately 1200 rpm and a duration of approximately 60 minutes, and a diameter of a produced particle may be in a range of approximately 1 mm-2 mm.

The polyester functional particle may include following raw material components calculated in parts by weight: 50 parts of PET pellets, 20 parts of chitin-containing functional modifier, 6 parts of titanium dioxide, 12 parts of sodium carboxymethyl cellulose, and 12 parts of diisopropyl trisulfide.

Step 4: Preparation of a Mixed Spinning Solution.

Ordinary polyester chips, the polyester functional particles, and accelerator may be added into a feeding port at the middle of the twin-screw extruder, and the twin-screw extruder may perform a high-speed melt blending process at a temperature of approximately 330° C., to obtain the mixed spinning solution.

The high-speed melt blending process may include a rotation speed of approximately 1000 rpm, and a blending duration of approximately 60 minutes. A weight percentage of the polyester functional particles may be approximately 3.1%, and a weight percentage of the accelerator may be approximately 3.5% based on a total weight of the mixed spinning solution. The accelerator may include amino silicone oil and n-butyl titanate in a mixing ratio of approximately 0.3:1.

Step 5: Spinning Molding.

Main spinning process parameters of polyester filament may include: an extrusion temperature of melt spinning of approximately 265° C., an initial pressure of approximately 8 MPa, a side blowing cooling air temperature of approximately 25° C., a first hot rolling temperature of approximately 175° C., a first drawing rate of approximately 1250 m/min, a second hot rolling temperature of approximately 90° C., a second drawing rate of approximately 3700 m/min, a molding temperature of approximately 130° C., and a winding speed of approximately 1860 m/min. Therefore, the chitin-containing polyester filament may be produced.

The chitin-containing polyester filament prepared according to embodiment 2 may have an antibacterial rate of approximately 97.8% against *Staphylococcus aureus, Escherichia coli, Candida albicans*, and any other bacteria that infects humans. The antibacterial polyester textile produced from knitting yarn composed of the chitin-containing polyester and cotton in a mass ratio of 30/70 may have an antibacterial rate of approximately 90.2%, and may still have an antibacterial rate of approximately 85.5% even after being washed 60 times, thereby having desired antibacterial durability. The chitin-containing polyester filament may have a monofilament fineness of approximately 2.8 dtex, a breaking strength of approximately 5.8 cN/dtex, a breaking elongation of approximately 39.2%, a CV value of the breaking elongation of approximately 9.0%, a uniform color, a light transmittance of approximately 74.5%, and a dry heat shrinkage rate of approximately 2.5%, and may not have obvious carbon black and particle agglomeration that are visible to the naked eye. Therefore, the disclosed chitin-containing polyester filament may be suitable for making high-end textile products.

Exemplary Embodiment 3

The present disclosure provides a chitin-containing polyester filament and a preparation method of the chitin-containing polyester filament. The preparation method may include following.

Step 1: Preparation of Modified Chitin.

1) Deacetylation.

A certain amount of chitin may be added into an alkaline solution where the sodium hydroxide solution and potassium hydroxide solution each having a weight percentage of 45% are mixed in equal proportions, to form a mixture 1. Then, a temperature of the mixture 1 may raise to approximately 70° C., a stirring speed of the mixture 1 may increase to 300 rpm, and the mixture 1 may be maintained at such temperature and stirring speed for approximately 10 hours. Through the deacetylation reaction, an amino groups-containing chitosan suspension may be produced. A weight percentage of the chitin may be approximately ½0 based on a total weight of the mixed alkaline solution. A deacetylation degree of the chitosan may be approximately 92%.

2) Amination Modification.

Hydroxypropyl trimethyl ammonium nitride may be added into the above chitosan suspension, and then a catalyst may be added to form a mixture 2. A temperature of the mixture 2 may raise to approximately 80° C., and the mixture 2 may undergo a reaction at such temperature for approximately 12 hours, such that the suspension may gradually turn into a clear yellow quaternary ammonium salt solution. A weight of the added hydroxypropyl trimethyl ammonium nitride may be 0.58 times of the weight of chitin. The catalyst may be zinc phosphomolybdate, and a weight percentage of the catalyst may be approximately 0.32% in a catalyst solution.

3) Separation and Purification.

Acetone may be slowly added dropwise to the quaternary ammonium salt solution to form a mixture 3, and then the mixture 3 may be placed in a refrigerator at a temperature of approximately minus 30° C. overnight. A modified chitin crystal may be produced by standing precipitation, filtration, watching filter cake with ice ethanol until the filtrate is clear, and drying in a vacuum drying oven at a temperature of approximately 45° C. In the separation and purification process, a volume ratio of the dripped acetone over the quaternary ammonium salt solution may be approximately 1:4.0.

Step 2: Preparation of Chitin-Containing Functional Modifier.

The modified chitin crystal may be added into a triethyl citrate solution which has a weight of 12 times of the modified chitin crystal and may be dissolved by stirring, and then diatomite, porogen and precipitant may be sequentially added to form a mixture 4. A temperature of the mixture 4 may raise to approximately 85° C., and the mixture 4 may be mixed at a stirring speed of approximately 2000 rpm for 50 minutes, such that the ethylene-vinyl acetate (EVA) coated particles may be gradually precipitated out. By standing and cooling the mixture 4 at room temperature, the chitin-containing functional modifier may be obtained.

A mass ratio of the modified chitin crystal over the diatomite may be approximately 5.0:1. The porogen may be NaCl, and a weight percentage of the added porogen may be approximately 2.8% based on the total weight of the chitin-containing functional modifier. The precipitant may be EVA, where a weight percentage of the vinyl acetate may be approximately 28.5%. A melt index of the precipitant may be approximately 24.1 g/10 min at 190° C. for 2.15 kg, and a weight percentage of the added precipitant may be approximately 12.5% based on the total weight of the chitin-containing functional modifier.

Step 3: Preparation of Polyester Functional Particles.

The chitin-containing functional modifier, PET pellets, titanium dioxide, sodium carboxymethyl cellulose, and diisopropyl trisulfide may be added into a mixer for stirring and granulation. The stirring process may include a speed of approximately 1200 rpm and a duration of approximately 90 minutes, and a diameter of a produced particle may be in a range of approximately 1 mm-2 mm.

The polyester functional particle may include following raw material components calculated in parts by weight: 60 parts of PET pellets, 20 parts of chitin-containing functional modifier, 3 parts of titanium dioxide, 9 parts of sodium carboxymethyl cellulose, and 8 parts of diisopropyl tri sulfide.

Step 4: Preparation of a Mixed Spinning Solution.

Ordinary polyester chips, the polyester functional particles, and accelerator may be added into a feeding port at the middle of the twin-screw extruder, and the twin-screw extruder may perform a high-speed melt blending process at a temperature of approximately 330° C., to obtain the mixed spinning solution.

The high-speed melt blending process may include a rotation speed of approximately 1200 rpm, and a blending duration of approximately 80 minutes. A weight percentage of the polyester functional particles may be approximately 4.0%, and a weight percentage of the accelerator may be approximately 6% based on a total weight of the mixed spinning solution. The accelerator may include amino silicone oil and n-butyl titanate in a mixing ratio of approximately 0.40:1.

Step 5: Spinning Molding.

Main spinning process parameters of polyester filament may include: an extrusion temperature of melt spinning of approximately 265° C., an initial pressure of approximately 8 MPa, a side blowing cooling air temperature of approximately 30° C., a first hot rolling temperature of approximately 170° C., a first drawing rate of approximately 1250 m/min, a second hot rolling temperature of approximately 90° C., a second drawing rate of approximately 3700 m/min, a molding temperature of approximately 125° C., and a winding speed of approximately 1860 m/min. Therefore, the chitin-containing polyester filament may be produced.

The chitin-containing polyester filament prepared according to embodiment 3 may have an antibacterial rate of approximately 98.5% against *Staphylococcus aureus*, *Escherichia coli*, *Candida albicans*, and any other bacteria that infects humans. The antibacterial polyester textile produced from knitting yarn composed of the chitin-containing polyester and cotton in a mass ratio of 30/70 may have an antibacterial rate of approximately 92%, and may still have an antibacterial rate of approximately 85.7% even after being washed 60 times, thereby having desired antibacterial durability. The chitin-containing polyester filament may have a monofilament fineness of approximately 3.5 dtex, a breaking strength of approximately 5.2 cN/dtex, a breaking elongation of approximately 38.5%, a CV value of the breaking elongation of approximately 8.7%, a uniform color, a light transmittance of approximately 75.2%, and a dry heat shrinkage rate of approximately 3.2%, and may not have obvious carbon black and particle agglomeration that are visible to the naked eye. Therefore, the disclosed chitin-containing polyester filament may be suitable for making high-end textile products.

The above detailed descriptions only illustrate certain exemplary embodiments of the present disclosure, and are not intended to limit the scope of the present disclosure. Those skilled in the art can understand the specification as whole and technical features in the various embodiments can be combined into other embodiments understandable to those persons of ordinary skill in the art. Any equivalent or modification thereof, without departing from the spirit and principle of the present disclosure, falls within the true scope of the present disclosure.

What is claimed is:

1. A preparation method of a chitin-containing polyester filament, comprising:
    preparing a modified chitin;
    preparing a chitin-containing functional modifier based on the modified chitin;
    preparing polyester (PET) functional particles based on the chitin-containing functional modifier and PET pellets;
    preparing a mixed spinning solution based on the polyester functional particles, wherein a weight percentage of the polyester functional particles is in a range of approximately 2%-4% based on a total weight of the mixed spinning solution; and
    performing a spinning molding of the mixed spinning solution to form the chitin-containing polyester filament.

2. The method according to claim 1, wherein:
    the mixed spinning solution further includes an accelerator, wherein:
        a weight percentage of the added accelerator is in a range of approximately 3%-6% based on the total weight of the mixed spinning solution, and
        the accelerator includes amino silicone oil and n-butyl titanate in a mixing ratio of approximately (0.25-0.40):1.

3. The method according to claim 2, wherein:
    the mixed spinning solution further includes ordinary polyester chips.

4. The method according to claim 1, wherein preparing the polyester functional particles includes:
    adding the chitin-containing functional modifier, the PET pellets, titanium dioxide, sodium carboxymethyl cellulose, and diisopropyl trisulfide into a mixer for stirring and granulation, wherein the stirring process includes a speed in a range of approximately 1000 rpm-1200 rpm, and a duration in a range of approximately 60 minutes-90 minutes.

5. The method according to claim 4, wherein:
    a diameter of a polyester functional particle is in a range of approximately 1 mm-2 mm, and
    the polyester functional particle includes following raw material components calculated in parts by weight: 50-60 parts of the PET pellets, 20-25 parts of the chitin-containing functional modifier, 3-6 parts of titanium dioxide, 6-12 parts of sodium carboxymethyl cellulose, and 6-12 parts of diisopropyl trisulfide.

6. The method according to claim 1, wherein parameters of the spinning molding process include:
    a first hot rolling temperature in a range of approximately 168° C.-175° C., for a first drawing rate in a range of approximately 1200 m/min-1250 m/min;
    a second hot rolling temperature in a range of approximately 85° C.-90° C., for a second drawing rate in a range of approximately 3680 m/min-3700 m/min; and
    a winding speed in a range of approximately 1560 m/min-1860 m/min.

7. The method according to claim 6, wherein parameters of the spinning molding process further include:
    an extrusion temperature of melt spinning in a range of approximately 250° C.-265° C.,
    an initial pressure of approximately 8 MPa, and
    a molding temperature in a range of approximately 120° C.-130° C.

8. The method according to claim 1, wherein preparing the modified chitin includes:
    a deacetylation process, an amination modification process, and a separation and purification process.

9. The method according to claim 8, wherein:
    in the deacetylation process, an amino groups-containing chitosan suspension is produced, wherein:

an alkaline solution includes a sodium hydroxide solution and a potassium hydroxide solution each having a weight percentage in a range of approximately 40%-45% mixed in equal proportions,
a weight percentage of chitin is in a range of approximately 1/20-1/25 based on a total weight of the mixed alkaline solution to form the amino groups-containing chitosan suspension, and
a deacetylation degree of the chitosan in the amino groups-containing chitosan suspension is in a range of approximately 80%-92%.

10. The method according to claim 9, wherein:
in the amination modification process, hydroxypropyl trimethyl ammonium nitride and a catalyst are added into the amino groups-containing chitosan suspension, to form a quaternary ammonium salt solution, wherein:
a weight of the added hydroxypropyl trimethyl ammonium nitride is approximately 0.50-0.58 times of a weight of the chitin, and
the catalyst includes zinc phosphomolybdate, and a weight percentage of the catalyst is in a range of approximately 0.11%-0.32% in a catalyst solution.

11. The method according to claim 10, wherein:
in the separation and purification process, acetone is slowly added dropwise to the quaternary ammonium salt solution, wherein:
a volume ratio of the dripped acetone over the quaternary ammonium salt solution is in a range of approximately 1:(3-4).

12. The method according to claim 1, wherein:
in preparation of the chitin-containing functional modifier, a solvent is triethyl citrate.

13. The method according to claim 12, wherein preparing the chitin-containing functional modifier includes:
dissolving the modified chitin in the solvent to form a triethyl citrate solution, and
sequentially adding diatomite, porogen and precipitant into the triethyl citrate solution.

14. The method according to claim 13, wherein:
a mass ratio of the modified chitin over the diatomite is in a range of approximately (3.2-5.0): 1.

15. The method according to claim 13, wherein:
the porogen includes one of $CaCl_2$), $MgCl_2$ and NaCl, and
a weight percentage of the porogen is in a range of approximately 1.2%-2.8% based on a total weight of the chitin-containing functional modifier.

16. The method according to claim 13, wherein:
the precipitant is ethylene-vinyl acetate (EVA), wherein a weight percentage of vinyl acetate is in a range of approximately 25%-28.5%,
a melt index of the precipitant is in a range of approximately (22 g-24 g)/10 min at 190° C. for 2.15 kg, and
a weight percentage of the added precipitant is in a range of approximately 8.0%-12.5% based on a total weight of the chitin-containing functional modifier.

* * * * *